Jan. 2, 1940.     F. E. RICE     2,185,267
BEER FAUCET
Filed Sept. 22, 1937     2 Sheets-Sheet 1
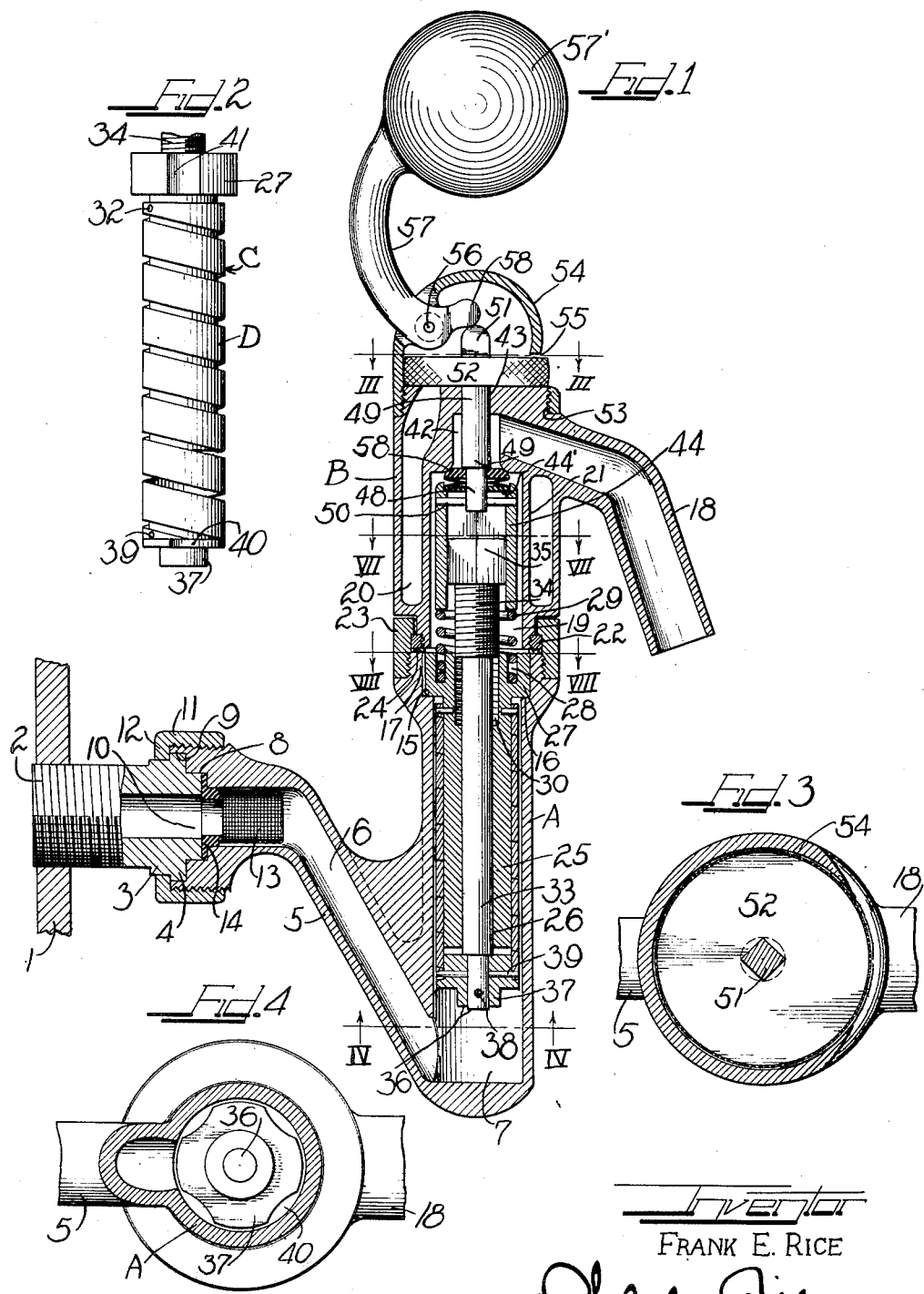
Inventor
FRANK E. RICE Jan. 2, 1940. F. E. RICE 2,185,267
BEER FAUCET
Filed Sept. 22, 1937 2 Sheets-Sheet 2
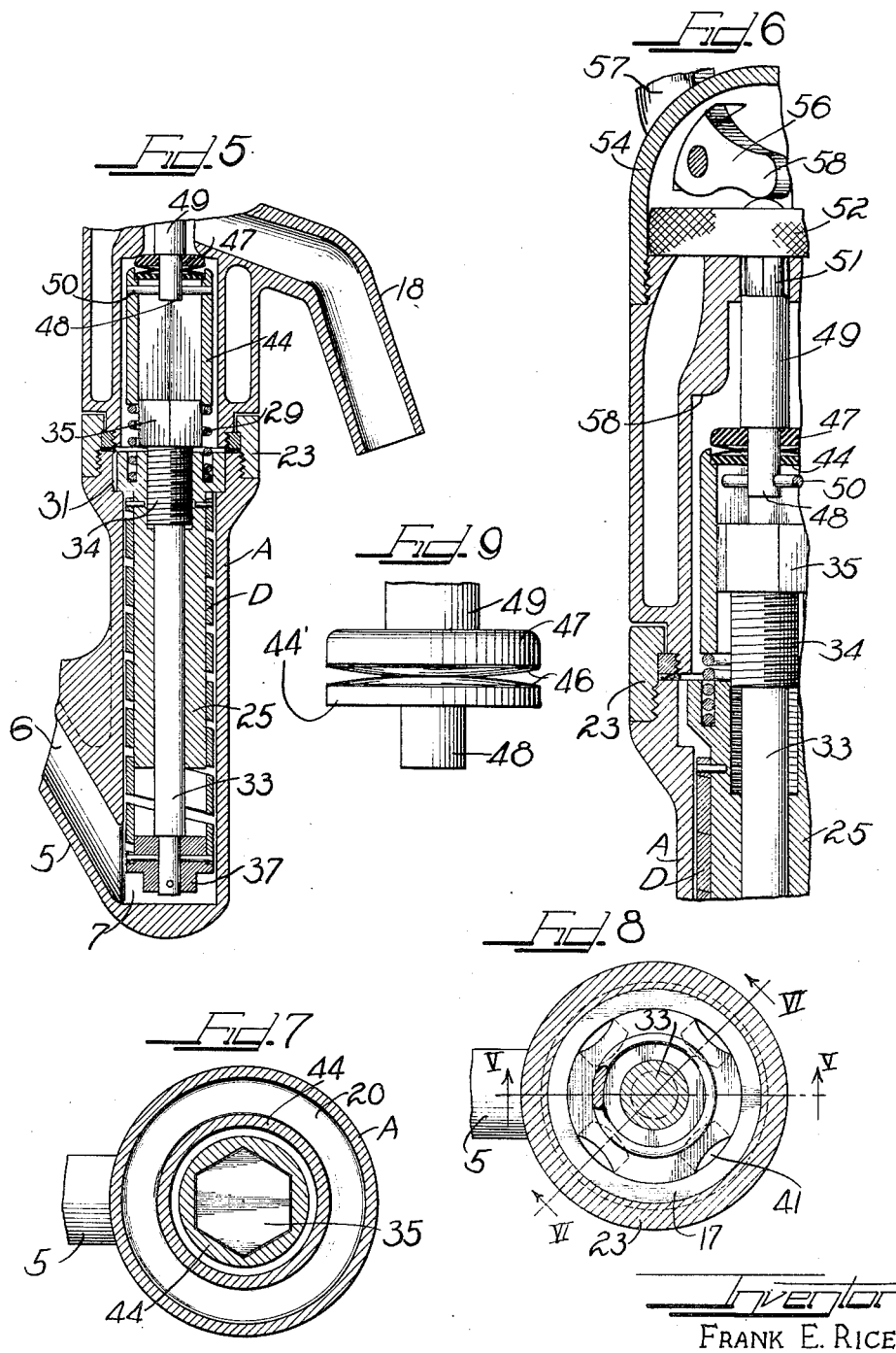
Inventor
FRANK E. RICE Patented Jan. 2, 1940

2,185,267

UNITED STATES PATENT OFFICE 2,185,267

BEER FAUCET

Frank E. Rice, Detroit, Mich., assignor to American Tap-Bush Company, Detroit, Mich., a corporation of Delaware Application September 22, 1937, Serial No. 164,998

7 Claims. (Cl. 225—5)

The present invention relates to a beer faucet constructed to be adjusted to accommodate beer pressures from ten to sixty-five pounds.

Beer is usually dispensed at bars by connections made between beer barrels or kegs and dispensing faucets. Such connections often include cooling coils arranged so that the beer may be cooled when dispensed from the faucets.

In order to dispense beer from barrels or kegs, it is necessary to create sufficient pressure in the barrels or kegs to force the beer out through the faucets. The practice in the matter of pressure varies with individual bartenders. Pressures varying all the way from a low pressure of ten pounds to a high pressure as high as sixty or sixty-five pounds are used at the present time, in different parts of the country. A faucet made to accommodate low pressure will leak under high pressure and a faucet made for high pressure will not work as well where the beer is dispensed under low pressure.

An object of the present invention is to provide a beer faucet which will operate without leakage, and without the creation of an excess amount of foam, under pressures ranging from low to high, i. e. ten pounds to sixty-five pounds.

Another object of the present invention is to provide a beer faucet which will dispense beer at the spigots at substantially the same pressure, regardless of the amount of pressure supplied to the barrel or keg in which the beer is packaged.

A further object of the present invention is to provide a beer faucet which is capable of adjustment to accommodate it to varying pressures, and which adjustment may be quickly and easily made.

Generally speaking, the faucet of the present invention contemplates a member defining a cylindrical chamber or bore, with a cylindrical core within the bore spaced from the wall thereof, to form a restricted passage. The bore is constructed to be adjustable so as to vary the cross-sectional area of such passage, to equalize pressures of beer in order that it may be dispensed through the spigot of the faucet under low pressure and without creation of an excessive amount of foam.

The above, other and further objects of the present invention will be apparent from the following description and accompanying drawings.

Figure 1 is an axial central section through a beer faucet of the present invention, showing it applied to a pipe connection, which is illustrated as in place in a partition or wall, and with the parts arranged to provide a passageway of minimum cross-sectional area between the core and the bore.

Figure 2 is an elevational view of the core of the present invention, showing it formed as a helix, and stretched to spread the space between the convolutions of the helix.

Figure 3 is an enlarged transverse sectional view taken substantially in the plane indicated by line III—III of Figure 1.

Figure 4 is an enlarged transverse sectional view taken substantially in the plane indicated by line IV—IV of Figure 1.

Figure 5 is a fragmental view of the faucet of Figure 1, showing the core adjusted to its maximum position for providing maximum area, or volumetric capacity, between the core and the bore.

Figure 6 is a fragmental vertical sectional view taken substantially in the plane indicated by line VI—VI of Figure 8.

Figure 7 is a transverse sectional view taken substantially in the plane indicated by line VII—VII of Figure 1.

Figure 8 is a transverse sectional view taken substantially in the plane indicated by line VIII—VIII of Figure 1, and Figure 9 is an elevation of the valve member.

The drawings will now be explained.

A portion of a wall or partition is indicated at 1, in Figure 1, through which wall projects a pipe 2, connected at its inner end, by means not shown, to a beer barrel or keg. The outer end of the pipe 2 is provided with annular enlargements 3 and 4, of different diameters, the enlargement 4 being of greater diameter.

The beer faucet of the form of the invention as illustrated includes two castings, A and B which are connected together in operative relation.

Formed as an integral part of the casting A is a branch 5, having a passage 6 through it communicating with the interior bore 7 of the casting A. The bore 7, in the casting A, is cylindrical for a major portion of its length and constitutes a chamber in the casting through which the beer passes from the branch 5 to the valve structure of the faucet.

The end of the branch 5 which is connected to the pipe 2 has two inner annular portions 8 and 9, for receiving the larger annular portion 4 of the pipe and for fitting over the reduced end 10 of the pipe, in order to make a shouldered connection between the branch and the pipe. A coupling ring 11 is threaded onto the exterior of the end of the branch and has an inturned flange 12 which bears against the outer surface of the enlargement 3 of the pipe and against the adjacent margin of the enlargement 4 to clamp the branch to the pipe.

A strainer 13 is interposed in the end of the branch adjacent the pipe 2, and is connected to, or formed integrally with a gasket portion 14 which seals the joint between the pipe and the branch.

The end of the casting A remote from the branch end, which is the lower end as illustrated in Figure 1, is counterbored at 15, forming an annular shoulder 16. The outer margin of this end of the casting is reduced in diameter at 17 and threaded.

The casting B has integrally formed with it a spigot 18, formed with an inner chamber 19, and an outer chamber 20, separated from the inner chamber 19 by an annular wall 21.

The inner chamber 19 is cylindrical, and of uniform diameter, and at its end adjacent the casting A, has the wall surrounding it threaded to receive an external ring 22. The diameter of the outer portion of the casting B, adjacent the casting A, is reduced in diameter with respect to the exterior of the main portion of the casting B.

The casting B is secured to the casting A by a ring nut 23 which has a shoulder for engaging the external ring 22 and which is interiorly threaded to engage the threaded extremity 17 of the casting A. Interposed between the external ring 22 and the adjacent ends of the casting A, is a washer or gasket 24 for sealing the joint between the castings.

The core, designated generally at C, is a composite structure including a cylindrical body 25, centrally apertured at 26, and having an integral head 27, of greater diameter than the body 25, and of such size as to enter the counterbore 15 in the upper end of the casting A. The head 27 is provided with an annular recess 28 constituting a pocket to receive a spring 29. The central portion of the head is counterbored at 30, and threaded for a purpose to be later explained. The core C, is installed in the casting A, the head is secured in an appropriate manner, against rotative movement with respect to the casting. Such means might include a pin or key 31 or other suitable arrangement.

A helix D is constructed from tubing by a milling operation to provide a plurality of convolutions of spiral formation, as may be readily observed in Figure 2. The helix D, is the deformable portion of the core and is applied around the cylindrical body 25 of the core C and at its upper end is pinned as at 32, or otherwise secured to the body 25 immediately adjacent the head 27 of the core.

A stem 33 is axially movable through the hollow cylindrical body 25 and has an upper portion 34 which is threaded to engage the threaded bore 30 of the core. Above the threaded portion 34 the stem is provided with a polygonally shaped head 35, herein illustrated as a hexagonal head. The lower end of the stem 33 is reduced in diameter to provide an end portion 36. Pinned to this reduced end portion 36, is a bored bushing 37 fastened to the portion 36 by a pin 38 or equivalent securing means. The lower end of the helix D is secured to the bushing 37 by a pin 39. The bushing 37 has its side margins broached as at 40, while the head 27 of the core is likewise broached as at 41, or otherwise provided with depressions, the broaching 40 and the depressions 41 constituting spaces for passage of beer past the bushing 37 and the head 27 of the core. The inner chamber 19 of the casting B communicates with the interior of the spigot 18 through a reduced portion 42 formed in the casting B adjacent the upper end of the casting. The upper end of the casting is apertured at 43.

Rotatable within the inner chamber 19 of the casting B, is a socket member 44 having its outer surface cylindrical and its inner surface polygonal to conform to the polygonal shape of the head 35 of the stem 33. The inner contour of the socket member 44 is herein illustrated as hexagonal to conform to the hexagonal head 35 of the stem.

The socket member 44 is open from end to end. The upper end of the socket member is recessed to receive a disk 44', against the upper surface of which are two dished disks 46, arranged with their convex spherical surfaces in contact, and against the upper of these is a valve disk 47. The disks 44' and 47, as well as the dished members 46, are centrally apertured to receive the cylindrical reduced end 48 of an operating pin 49. The pin 49 is connected to the socket member 44 in driving relation by means of a pin 50 passed through the socket member and through an aperture in the reduced end portion 48 of the operating pin, as may be readily observed in Figure 1. The operating pin 49 projects upwardly through the aperture 43 in the end of the casting B, where its upper extremity 51 is of polygonal shape, being herein illustrated as square, as may be observed in Figure 3. Resting against the upper end of the casting B is a wheel 52, having an aperture contoured to fit in driving relation with the extremity 51 of the operating pin 49, and having its periphery milled for easy manipulation. The extremity of pin 51 is of sufficient length so that as the operating pin is depressed, as later explained, driving relation between the pin and the disk 52 will be maintained.

The upper end of the casting B is provided with an annular seat 53 to receive a cap 54 for covering the upper end of the faucet. The cap and the seat are threaded for connection. The cap is provided with an arcuate recess 55 through which a portion of the wheel 52 projects for manipulation, as may be observed in Figures 1 and 3. The cap is provided with ears to which is pivoted as at 56, a shank 57 having an inner end 57a disposed to work against the extremity 51 of the operating pin 49 and at its other end provided with a ball handle 57' for actuation of the shank.

The spring 29, seated in the counterbore 28 in the head of the core C, acts against the adjacent end of the socket member 44 to maintain the socket member 44 in spaced relation with respect to the head of the core member. The action of the spring 29, therefore, serves to maintain the disk 47 in tight engagement against a valve seat 58 formed at the junction of the inner chamber 19 and the chamber 42, of the casting B. The provision of the dished spring disks 46, between the disks 44 and 47, constitute additional spring means for maintaining the valve disk 47 in tight engagement with its valve seat to thus seal the joint between the interior of the faucet and the spigot, when the faucet is closed.

Figure 1 illustrates the arrangement of parts when the faucet is closed to beer passage and the core member has been adjusted to provide minimum cross-sectional area, or volumetric capacity, between the core member and the bore of the chamber 7 of the casting A. In this position, the faucet is adjusted for maximum pressure.

With the adjustment shown in Figure 1, manipulation of the ball handle 57', about the pivot of the shank will open the valve between the chamber 19 and the chamber 53, to allow the discharge of beer through the spigot 18.

The construction of the faucet is such that with the parts arranged as in Figure 1, beer under maximum pressure in the barrel or keg, is delivered through the spigot at substantially a low pressure or no pressure, thereby retarding the formation of foam in the glass or other receptacle into which the beer is discharged.

In order to accommodate the faucet to pressures less than maximum, the wheel 52 is manipulated to be rotated in a direction to move the stem 33 downwardly, as shown in the drawings, thereby lengthening or stretching the helix D. Figure 5 shows the relationship of the parts when the helix has been extended to its maximum distance, thereby accommodating the faucet to the lowest minimum pressure of substantially say, ten pounds. With the helix stretched or extended as described, the faucet is manipulated as heretofore mentioned.

Extending the helix as described, causes a slight diametrical contraction of the helix and an enlargement of the space between convolutions. The space between the convolutions past the cross-sectional area of the passageway between the spaces of the convolutions of the helix and the bore constitute passageway for the beer. It will thus be observed, that by lengthening the helix, the volumetric capacity of the beer passage is increased between the pipe 2 and the valve which controls the outlet of beer from the faucet.

Rotation of the wheel 52 in the manner described causes rotative movement of the socket member 44. Because of the sliding engagement between the socket member 44 and the head 35 of the stem 33, the stem is given corresponding rotative movement, thus causing the threaded portion 34 of the stem to move downwardly or upwardly, in accordance with the direction of rotation of the wheel 52.

It is possible with the construction of the present invention, to eliminate a stuffing box about the operating pin 49 because of the fact that the pressure of the beer is equalized within the faucet to a point that when it reaches the valve it has substantially just sufficient pressure to flow out of the spigot 18 without the formation of foam on the beer as dispensed.

The faucet has herein been illustrated as designed to stand in vertical position when installed, to discharge beer downwardly through the spigot to a glass or other container supported beneath it.

It is to be understood that the faucet of the present invention may be readily adapted to be applied in a manner to extend horizontally either endwise with respect to a wall or partition, or parallel to such wall or partition, in which event the spigot would be arranged to discharge the beer downwardly into a suitable receptacle.

The minimum clearance between the core and the bore is created when the pressure of the beer in the barrels or kegs is thirty pounds or higher. It has been found in practice, that a beer faucet constructed in accordance with the principles of the present invention and having a minimum clearance of from .010 inch to .014 inch, is suitable for discharging beer without formation of excessive foam and without undue pressure at the spigot.

When the valve, against the valve seat 58 is opened by movement of the ball handle in clockwise direction, the beer passes from the pipe 2 through the passage 6 in the branch 5, into the chamber 7 of the casting A, thence through the recesses 40 in the bushing 37 upwardly through the restricted passageway between the core and the bore, through the spaces 41 in the head 27 of the core structure, thence upwardly within the inner chamber 19 of the casting B, into the chamber 42 thence through the spigot 18 into a receptacle.

The construction of the faucet of the present invention is such that it may be readily disassembled for cleaning purposes or for replacement, and readily assembled without requiring mechanical knowledge of more than a casual amount.

The gist of the present invention resides in the provision of a beer faucet having a bored member wherein a core is interposed, for cooperating with the wall of the bore to constitute a restricted passageway, in which the core is expansible and contractible to vary the cross-sectional area of such passageway to accommodate the faucet for use with bar equipment in which the pressures in the beer barrels or kegs vary all the way from ten pounds to sometimes as high as sixty and sixty-five pounds, according to the practice of any bartender.

The construction of the helix D, from a piece of tubing, provides a structure which is long lived, and which possesses sufficient resiliency or yieldability to function in the manner described and for the purpose intended.

The function performed by the construction of the valve member 47 and the dished washers 46 is as follows. The pin 49 may be rotated and moved axially, when the member 47 is against its seat, without causing excessive wear of the member 47 due to friction on the valve seat. The dished washers cause the valve member 47 to hug the pin 49 tightly and prevent leakage between the member 47 and the pin 49.

The invention has been described herein more or less precisely as to details, yet it is to be understood that the invention is not to be limited thereby, as changes may be made in arrangement and proportion of parts, and equivalents may be substituted, without departing from the spirit and scope of the invention.

The invention is claimed as follows:

1. In combination, a member having a cylindrical bore therein, a core in the form of a helix disposed within said bore and in spaced relation to the bore wall to form an annular restricted passage therebetween, said helix being fixed at one end and free at the other end, and means connected to the other end of said helix operable to lengthen or shorten the same, said means being constrained against oscillatory movement which might be occasioned by effort of the free end of the helix to twist as the length of the helix is altered.

2. A valve structure for beer faucets in combination with an annular valve seat, a stem extending axially through said seat, a disk valve member on said stem positioned to contact said seat, a second disk on said stem axially spaced from said valve member, reversely arranged dished spring disk members between said valve member and said second disk and constituting resilient backing means for the valve member, said valve member second disk and spring disks being axially movable with respect to the stem.

3. A core for a beer faucet comprising a body having a central bore through it and having a head at one end, a helix surrounding said body and secured to the same adjacent said head, a bushing secured to the free end of said helix, and a stem extending through said body and at one end connected to said bushing, said stem and said body being in threaded relation so that on rotative movement of said stem the bushing may be axially moved to contract and expand said helix.

4. A beer faucet structure including casing means providing an elongated cylindrical bore with an inlet thereto and a co-axially arranged second bore of greater diameter constituting a chamber with an outlet spigot therewith in communication, a core structure within said bore and comprising an annular body member seated in the casing at the junction of said bores and a deformable core member in said first bore spaced from the wall thereof to provide a restricted annular passageway therebetween for beer flow, an annular valve seat formed at the junction of said chamber and spigot, a stem threaded in said core body and connected to the remote end of said core member to deform said core member as said stem is rotated, said stem having a polygonally shaped head within said chamber, a socket member within said chamber embracing said head in driving relation, said socket member carrying a resiliently backed valve member positioned to engage said seat, spring means acting against said socket to normally maintain said valve member against the seat, a pin extending axially through said valve member and connected to said socket member for rotating it, said pin having a shoulder against said valve member and being capable of endwise movement, means for moving said pin endwise to unseat said valve member, and means for rotating said pin to rotate said socket member and stem to thereby impart endwise movement to said stem to vary the diameter of said core member.

5. A beer faucet structure having a discharge spigot and including a member having a bore and having an inlet to the bore, a core member in said bore, said core including a body and a helix surrounding the body and secured at one end to said body, said helix having axially flat convolutions defining a generally cylindrical outer surface, said core being disposed in said bore with the convolutions of the helix spaced from the bore wall and defining a restricted annular passageway therebetween, and means operative adjacent the spigot end of said structure for elongating and shortening said helix to vary the cross-sectional area of said passageway.

6. A beer faucet structure having a discharge spigot and including a member having a bore and having an inlet to the bore, a core member in said bore, said core including a body and a helix surrounding the body and secured at one end to said body, said helix having axially flat convolutions defining a generally cylindrical outer surface, said core being disposed in said bore with the convolutions of the helix spaced from the bore wall and defining a restricted annular passageway therebetween, and means connected to one end of said helix and operative to increase its diameter and reduce the space between its convolutions to thereby reduce the cross-sectional area of said passageway to liquid flow and also operative to lengthen said helix to reduce its diameter and increase the space between its convolutions to thereby enlarge the cross-sectional area of said passageway.

7. A beer faucet structure having a discharge spigot and including a member having a bore and having an inlet to the bore, a core member in said bore, said core including a body and a helix surrounding the body and secured at one end to said body, said helix having axially flat convolutions defining a generally cylindrical outer surface, said core being disposed in said bore with the convolutions of the helix spaced from the bore wall and defining a restricted annular passageway therebetween, said body extending part way of the length of said helix, a bushing secured to the other end of said helix, a stem extending axially through said body and connected at one end to said bushing, said stem being threaded in said body, and means for rotating said stem in said body to move said stem axially and to twist and untwist said helix to thereby alter its diameter and the space between its convolutions for varying the volumetric capacity of said passageway to liquid flow.

FRANK E. RICE.